(12) United States Patent
Yang et al.

(10) Patent No.: US 11,710,231 B2
(45) Date of Patent: Jul. 25, 2023

(54) METHOD AND APPARATUS FOR MAMMOGRAPHIC MULTI-VIEW MASS IDENTIFICATION

(71) Applicant: Ping An Technology (Shenzhen) Co., Ltd., Shenzhen (CN)

(72) Inventors: Zhicheng Yang, Palo Alto, CA (US); Zhenjie Cao, Palo Alto, CA (US); Yanbo Zhang, Palo Alto, CA (US); Peng Chang, Palo Alto, CA (US); Mei Han, Palo Alto, CA (US); Jing Xiao, Palo Alto, CA (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 262 days.

(21) Appl. No.: 17/165,087

(22) Filed: Feb. 2, 2021

(65) Prior Publication Data
US 2022/0067927 A1 Mar. 3, 2022

Related U.S. Application Data

(60) Provisional application No. 63/072,379, filed on Aug. 31, 2020.

(51) Int. Cl.
| | |
|---|---|
| *G06T 7/00* | (2017.01) |
| *G06T 7/11* | (2017.01) |
| *G06T 7/30* | (2017.01) |
| *G06V 10/25* | (2022.01) |
| *G06V 10/75* | (2022.01) |

(52) U.S. Cl.
CPC .............. *G06T 7/0012* (2013.01); *G06T 7/11* (2017.01); *G06T 7/30* (2017.01); *G06V 10/25* (2022.01);

(Continued)

(58) Field of Classification Search
CPC ....... G06T 7/0012; G06T 7/0014; G06T 7/11; G06T 7/30; G06T 2207/20076;

(Continued)

(56) References Cited

U.S. PATENT DOCUMENTS

| | | | |
|---|---|---|---|
| 10,430,946 B1* | 10/2019 | Zhou | A61B 5/02007 |
| 2011/0013819 A1* | 1/2011 | Raundahl | G06V 10/763 |
| | | | 382/132 |

(Continued)

OTHER PUBLICATIONS

Zhao et al. "Cross-view attention network for breast cancer screening from multi-view mammograms." ICASSP 2020-2020 IEEE International Conference on Acoustics, Speech and Signal Processing (ICASSP). IEEE, Apr. 2020. (Year: 2020).*

(Continued)

*Primary Examiner* — Katrina R Fujita
(74) *Attorney, Agent, or Firm* — Anova Law Group, PLLC

(57) ABSTRACT

A method, applied to an apparatus for mammographic multi-view mass identification, includes receiving a main image, a first auxiliary image, and a second auxiliary image. The main image and the first auxiliary image are images of a breast of a person, and the second auxiliary image is an image of another breast of the person. The method further includes detecting the nipple location based on the main image and the first auxiliary image; generating a first probability map of the main image based on the main image, the first auxiliary image, and the nipple location; generating a second probability map of the main image based on the main image, the second auxiliary image, and the nipple location; and generating and outputting a fused probability map based on the first probability map and the second probability map.

20 Claims, 8 Drawing Sheets

(52) U.S. Cl.
CPC .. *G06V 10/751* (2022.01); *G06T 2207/20076* (2013.01); *G06T 2207/20084* (2013.01); *G06T 2207/30068* (2013.01); *G06V 2201/03* (2022.01); *G06V 2201/07* (2022.01)

(58) Field of Classification Search
CPC . G06T 2207/20081; G06T 2207/20084; G06T 2207/30068; G06V 10/25; G06V 10/454; G06V 10/751; G06V 10/82; G06V 2201/03; G06V 2201/07
See application file for complete search history.

(56) References Cited

U.S. PATENT DOCUMENTS

| | | | |
|---|---|---|---|
| 2019/0065884 A1* | 2/2019 | Li | G06V 10/25 |
| 2021/0019880 A1* | 1/2021 | Chan | G06V 10/82 |

OTHER PUBLICATIONS

Sahiner et al. "Joint two-view information for computerized detection of microcalcifications on mammograms." Medical physics 33.7Part1 (2006): 2574-2585. (Year: 2006).*

Celaya-Padilla, et al. "Bilateral image subtraction and multivariate models for the automated triaging of screening mammograms." BioMed research international 2015 (2015). (Year: 2015).*

Dubrovina et al. "Computational mammography using deep neural networks." Computer Methods in Biomechanics and Biomedical Engineering: Imaging & Visualization 6.3 (2016) (Year: 2016).*

* cited by examiner

METHOD AND APPARATUS FOR MAMMOGRAPHIC MULTI-VIEW MASS IDENTIFICATION

CROSS-REFERENCE TO RELATED APPLICATION

This application claims the priority to U.S. Provisional Patent Application No. 63/072,379, filed on Aug. 31, 2020, the content of which is incorporated by reference in its entirety.

FIELD OF THE DISCLOSURE

The present disclosure generally relates to the field of medical equipment technology and, more particularly, relates to a method and an apparatus for mammographic multi-view mass identification.

BACKGROUND

Mammography is widely used as a cost-effective early detection method for breast cancer. A computer-aided diagnosis (CAD) system has the promise to detect the abnormal regions on digitized mammogram images. Most deep neural network based (DNN-based) approaches for mammogram analysis are designed for single view analysis. Significant progress has recently been made in the performance of CAD systems, especially with the advance of DNN-based methods. Nonetheless, mammographic abnormality detection remains challenging, largely due to the high accuracy requirement set by the clinical practice.

A standard mammography screening procedure acquires two low-dose X-ray projection views for each breast, namely, a craniocaudal (CC) view and a mediolateral oblique (MLO) view. Radiologists routinely use all views in breast cancer diagnosis. The ipsilateral analysis refers to the diagnosis based on the CC and MLO views of a same breast, while the bilateral analysis combines the findings from the same views of the two breasts (that is, either the two CC views or the two MLO views of the two breasts). For example, the radiologists may cross-check the lesion locations through the ipsilateral analysis, and use the symmetry information from the bilateral analysis to improve the decision accuracy.

Many of the existing mammographic lesion detection methods focus on one view, therefore they are unable to capture the rich information from the multiple view analysis. Recently several DNN-based dual-view approaches, performing either ipsilateral or bilateral analysis, have been proposed. However, the existing DNN-based architectures still need to be further improved to provide desired performance for multi-view analysis. The disclosed method and apparatus for mammographic multi-view mass identification are directed to solve one or more problems set forth above and other problems in the art.

BRIEF SUMMARY OF THE DISCLOSURE

One aspect of the present disclosure provides a method applied to an apparatus for mammographic multi-view mass identification. The method includes receiving a main image, a first auxiliary image, and a second auxiliary image. The main image and the first auxiliary image are images of a breast of a person, and the second auxiliary image is an image of another breast of the person. The method further includes detecting a nipple location based on the main image and the first auxiliary image; generating a first probability map of the main image based on the main image, the first auxiliary image, and the nipple location; generating a second probability map of the main image based on the main image, the second auxiliary image, and the nipple location; and generating and outputting a fused probability map based on the first probability map and the second probability map.

Another aspect of the present disclosure provides an apparatus for mammographic multi-view mass identification. The apparatus includes a nipple detector, configured to receive a main image and a first auxiliary image of a breast of a person, and detect a nipple location based on the main image and the first auxiliary image; an ipsilateral analyzer, configured to receive the main image, the first auxiliary image, and the nipple location obtained by the nipple detector, and generate and output a first probability map of the main image; and a bilateral analyzer, configured to receive the main image, the nipple location, and a second auxiliary image, and generate and output a second probability map of the main image. The second auxiliary image is an image of another breast of the person. The apparatus further includes an integrated fusion network device, configured to receive the main image, the first probability map, and the second probability map, and generate and output a fused probability map.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

The importance of information fusion from multi-view mammograms has been recognized previously. Many existing methods for multi-view information fusion rely on handcrafted features and fusion rules. With the development of deep learning technology, the application of DNN-based approaches has achieved wide success in medical image processing and computer vision in general.

Deep learning has been applied to mammographic mass detection, and most of the work focus on single view based approaches. Recently, multi-view based approaches have attracted increasing interests, and different DNN-based approaches have been presented for ipsilateral analysis of multi-view mammograms. However, most of existing approaches do not model the geometry relation across views explicitly. For example, in an existing approach, a cross-view relation network is added to the Siamese Networks for mass detection, but the geometric features and embedding used for the relation network are the same as those used in an approach designed for single view object detection. In another example, DNN-based approaches are presented for bilateral analysis without providing ipsilateral analysis simultaneously. Other exemplary multi-view based approaches include RNN-based multi-view approaches for mass classification, DNN-based multi-view approaches for breast cancer screening, etc.

According to the disclosed apparatus and method for mammographic multi-view mass identification, a Faster-RCNN network module with Siamese input and a DeepLab network module with Siamese input work in parallel to simultaneously perform ipsilateral and bilateral analysis. The relation network according to the present disclosure is explicitly designed to encode the mass to nipple distance for the ipsilateral analysis, in tandem with a DNN-based nipple detector. The approach according to the present disclosure explicitly embed the mass-to-nipple distance into a DNN architecture for mammographic lesion detection.

Figure 1:
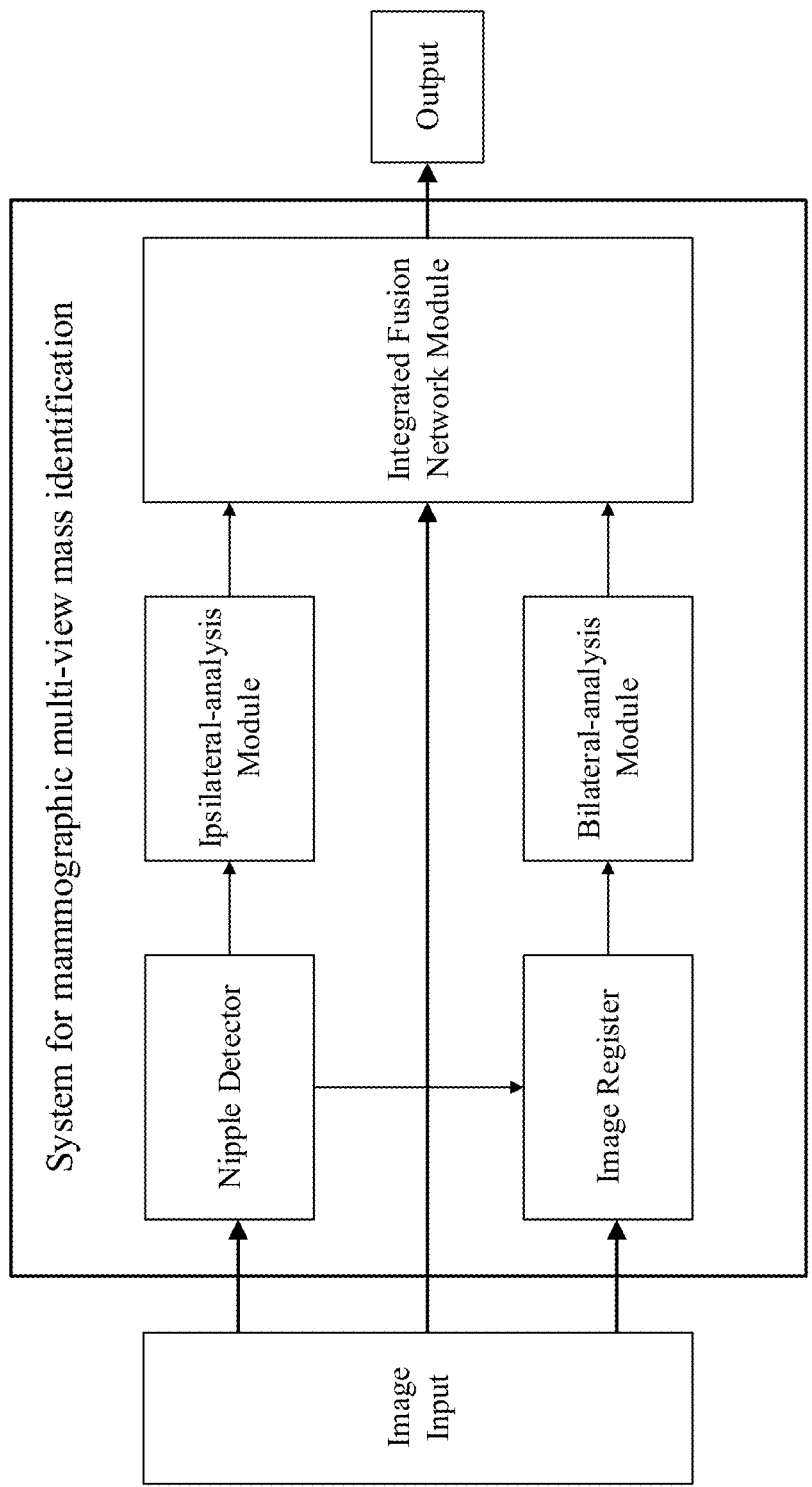
FIG. 1 illustrates a schematic structural diagram of an exemplary apparatus for mammographic multi-view mass identification according to various embodiments of the present disclosure.

The present disclosure provides an apparatus for mammographic multi-view mass identification. FIG. 1 illustrates a schematic structural diagram of an exemplary apparatus for mammographic multi-view mass identification according to various embodiments of the present disclosure. Referring to FIG. 1, the apparatus may include a nipple detector, an image register, an ipsilateral analyzer, a bilateral—analysis module, and an integrated fusion network device.

The nipple detector may be configured to receive a main image of a breast and a first auxiliary image of a breast of a person, and detect the nipple location based on the main image and the first auxiliary image. The detected nipple location may be able to facilitate the determination of the distance from a region of interest (RoI) to the nipple in a subsequent process. In one embodiment, the nipple detector may be a DNN-based nipple detector.

In one embodiment, the main image may be a right craniocaudal (RCC) image, and the first auxiliary image may be an ipsilateral image, e.g., a right mediolateral oblique (RMLO) image. That is, the main image may be a CC image of the right breast and the first auxiliary image may be an MLO image of the right breast. It should be noted that the main image and the first auxiliary image may be ipsilateral images of a same breast. In many cases, four mammographic images may be available: an RCC image, an RMLO image, a left craniocaudal (LCC) image, and a left mediolateral oblique (LMLO) image, and accordingly, the combination of the main image and the first auxiliary image may have four different selections: the main image is the RCC image while the first auxiliary image is the RMLO image; the main image is the RMLO image while the first auxiliary image is the RCC image; the main image is the LCC image while the first auxiliary image is the LMLO image; and the main image is the LMLO image while the first auxiliary image is the LCC image.

The image register may be configured to receive the main image and an initial auxiliary image, flip the initial auxiliary image, and then warp the flipped initial auxiliary image toward the main image according to the breast contour to generate a second auxiliary image. The main image received by the image register may be the same as the main image received by the nipple detector. In one embodiment, the initial auxiliary image received by the image register may be a bilateral image, e.g., an LCC image. After flipping and warping the initial auxiliary image, the obtained second auxiliary image may then be sent to the bilateral analyzer to facilitate the DNN-based learning of the symmetry constraint from the bilateral images. For example, an input pair of the same view images (e.g., either the two CC view images or the two MLO view images), including the main image and the initial auxiliary image, may be registered, the image used as the initial auxiliary image may then be horizontally flipped and warped toward the main image according to the breast contour to obtain the second auxiliary image. The main image may be an image selected from the two pairs of images, including the pair of CC images and the pair of MLO images. Once the main image is selected, the initial auxiliary image may be the other image from the same pair, and the first auxiliary image may be an image from the other pair. For example, when the main image is a CC image of a breast, the initial auxiliary image may also be a CC image, but correspond to the other breast, and the first auxiliary image may be an MLO image of the same breast. Therefore, the first auxiliary image and the main image may be taken on the same breast, such that the first auxiliary image and the main image may be a pair of ipsilateral images. For example, when the main image is an LCC image, the first auxiliary image may be an LMLO image, and the initial auxiliary image may be an RCC image; when the main image is an RMLO image, the first auxiliary image may be an RCC image, and the initial auxiliary image may be an LMLO image.

The ipsilateral analyzer may be configured to receive the main image, the first auxiliary image, and the nipple location obtained by the nipple detector. The ipsilateral analyzer may also be configured to generate and output a first probability map (e.g., Ipsi-prob map) of the main image based on the main image, the first auxiliary image, and the nipple location.

The bilateral analyzer may be configured to receive the main image together with the nipple location and the second auxiliary image obtained by the image register. The bilateral analyzer may also be configured to generate and output a second probability map (e.g., Bi-prob map) of the main image based on the main image, the nipple location, and the warped and flipped bilateral image.

The first probability map and the second probability map may be attentions of the comprehensive information of the ipsilateral and bilateral images. For example, the first probability map and the second probability map may include mass information of pixels in the main image generated by the ipsilateral analyzer and the bilateral analyzer, respectively. The mass information of a pixel in the main image may include the texture density determined by the brightness of the pixel. In addition, adjacent pixels with similar brightness may be further determined as a region for further analysis. For example, each of the ipsilateral analyzer and the bilateral analyzer may be further configured to compute the similarities between adjacent pixels based on the two input images (e.g., the main image and the first auxiliary image for the ipsilateral analyzer, and the main image and the second auxiliary image for the bilateral analyzer) to determine each region that contains pixels with similar brightness. Moreover, a region with brightness, shape, area size, and/or position deviating from an expected value may be determined as a RoI. For example, a threshold value may be preset for each of the parameters including brightness, shape, area size, and relative position with respect to the nipple location, and when at least one of the parameters of a region exceeds the corresponding threshold value, the region may be determined as a RoI.

In one embodiment, the first probability map may further include a lesion possibility of each pixel on the main image; and the second probability map may also include a lesion possibility of each pixel on the main image. The lesion possibility of a pixel may be determined by each of the ipsilateral analyzer and the bilateral analyzer based on the input images. Moreover, a region of pixels having lesion possibilities exceeding a preset possibility may be determined as a RoI.

It should be noted that both the first probability map and the second probability map are intermediate results for lesion analysis according to the disclosed apparatus for mammographic multi-view mass identification. The first and second probability maps may further be analyzed in the integrated fusion network device in order to generate a more accurate probability map of the main image.

The integrated fusion network device may be configured to receive the main image, the first probability map from the ipsilateral analyzer, and the second probability map from the bilateral analyzer. Moreover, the integrated fusion network device may be configured to generate and output a fused probability map based on the main image and the two probability maps. The fused probability map may include a lesion possibility of each pixel on the main image. By analyzing the first probability map and the second probability map together to generate the fused probability map, the lesion possibility of each pixel on the main image may be more accurate. As such, the disclosed apparatus for mammographic multi-view mass identification may improve the accuracy in determining mammographic lesions. Further, one or more RoIs may be determined based on the fused probability map, and the location, the size, and the shape of each RoI can also be determined.

Figure 2:
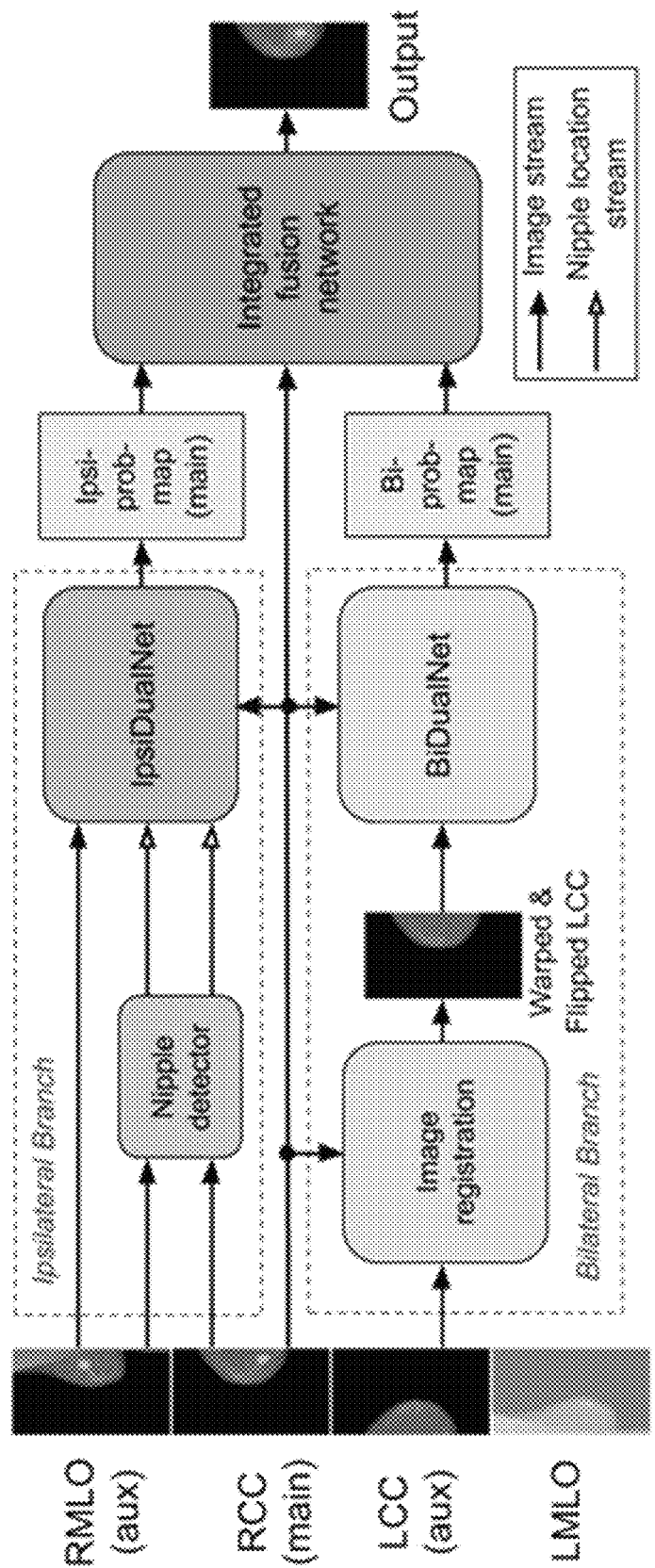
FIG. 2 illustrates schematic diagram of data flow of an operation process of an exemplary apparatus for mammographic multi-view mass identification according to various embodiments of the present disclosure.

FIG. 2 illustrates a schematic diagram of data flow of an operation process of an exemplary apparatus for mammographic multi-view mass identification according to various embodiments of the present disclosure. The apparatus may be consistent with the one shown in FIG. 1. Referring to FIG. 2, at first, an image of a breast may be selected as the main image and its corresponding ipsilateral view and bilateral view may be selected as the auxiliary images. The main image and the auxiliary images may be together input into the apparatus. For example, the main image may be an RCC view, and the auxiliary images may include an ipsilateral view and a bilateral view corresponding to the main view. The ipsilateral view may be an RMLO view, and the bilateral view may be an LCC view. The RCC view and the RMLO view may be input together into the ipsilateral branch. In parallel, the RCC view and the LCC view may be input together into the bilateral branch. Each branch may generate a probability map of the main image (e.g., the Ipsi-prob map and the Bi-prob map shown in FIG. 2; or the first probability map and the second probability map as described above) and the probability maps generated by the two branches may then be input into the integrated fusion network device along with the main image (the RCC view) to generate a final output, e.g., the fused probability map described above. Inside the ipsilateral branch, a DNN-based nipple detector may be added to extract the nipple locations on both views (e.g., RCC view and RMLO view). The nipple locations may then be input into the ipsilateral analyzer along with the two views for ipsilateral analysis. Inside the bilateral branch, the bilateral views (LCC views) may be registered in the image register before being sent to the bilateral analyzer together with the main image (RCC view). This combined ipsilateral and bilateral analysis can be applied to any given image that is used as the main image.

According to the disclosed apparatus, the image register and the ipsilateral analyzer may both need to use nipple locations extracted from the input images. In one embodiment, the nipple detector may include a Faster-RCNN based key-point detection framework, and thus may be able to identify the nipple locations with satisfactory accuracy. For example, in the in-house dataset that includes a total of 11,228 images, only one nipple prediction is incorrect.

Most women have roughly symmetric breasts in terms of density and texture. This property is well leveraged by radiologists to identify the abnormalities in mammograms. Hinging on a bilateral dual-view, radiologists are able to locate a mass based on its distinct morphologic appearance and relative position compared to its corresponding area in the other lateral image.

Figure 3:
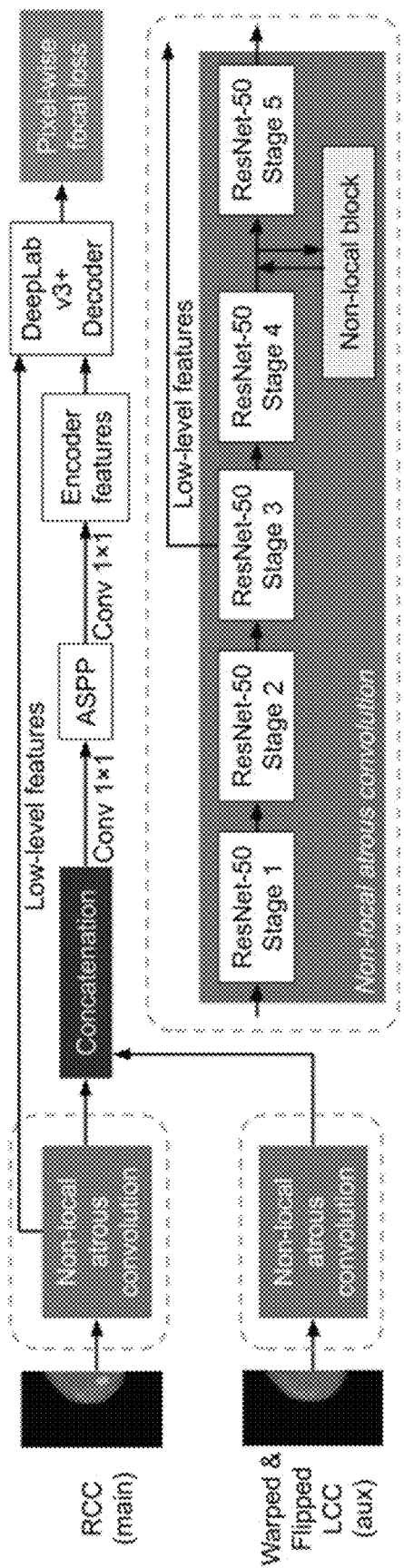
FIG. 3 illustrates a schematic architecture of an exemplary bilateral analyzer in the apparatus for mammographic multi-view mass identification shown in FIG. 1.

To incorporate this diagnostic information and facilitate the learning of the symmetry constraint, a bilateral analyzer is developed. FIG. 3 illustrates a schematic architecture of an exemplary bilateral analyzer in the apparatus for mammographic multi-view mass identification shown in FIG. 1. Referring to FIG. 3, the bilateral analyzer may be derived from a DeepLab v3+ structure, enhanced with a first Siamese input pattern and a pixel-wise focal loss (PWFL) function. The first Siamese input pattern may include two atrous convolution modules. The two atrous convolution modules may share the same weights and extract feature maps from the bilateral images in the same manner. Each atrous convolution module may include five 50-layer residual networks (ResNet-50) connected in a series to form a five-stage network, and a non-local (NL) block located between the fourth stage (Stage 4) and the fifth stage (Stage 5). The ResNet-50 in each atrous convolution module may function as a backbone. The atrous convolution module receiving the main image may further include an output for low-level features at the third stage (Stage 3). The extracted feature maps by the two atrous convolution modules may be a main feature map and an auxiliary feature map, respectively. The auxiliary feature map may then be assumed as a reference and concatenated with the main feature map. In turn, the feature difference at the same location can highlight the abnormality. For example, the outputs from the backbones of the two atrous convolution modules may perform a channel-wise concatenation, and A 1×1 convolution may down-sample the number of channels from a concatenated tensor into half. The bilateral analyzer may further generate a segmentation map for the main image. During a training process, the PWFL function may be used to improve the performance of the bilateral analyzer.

Figure 4:
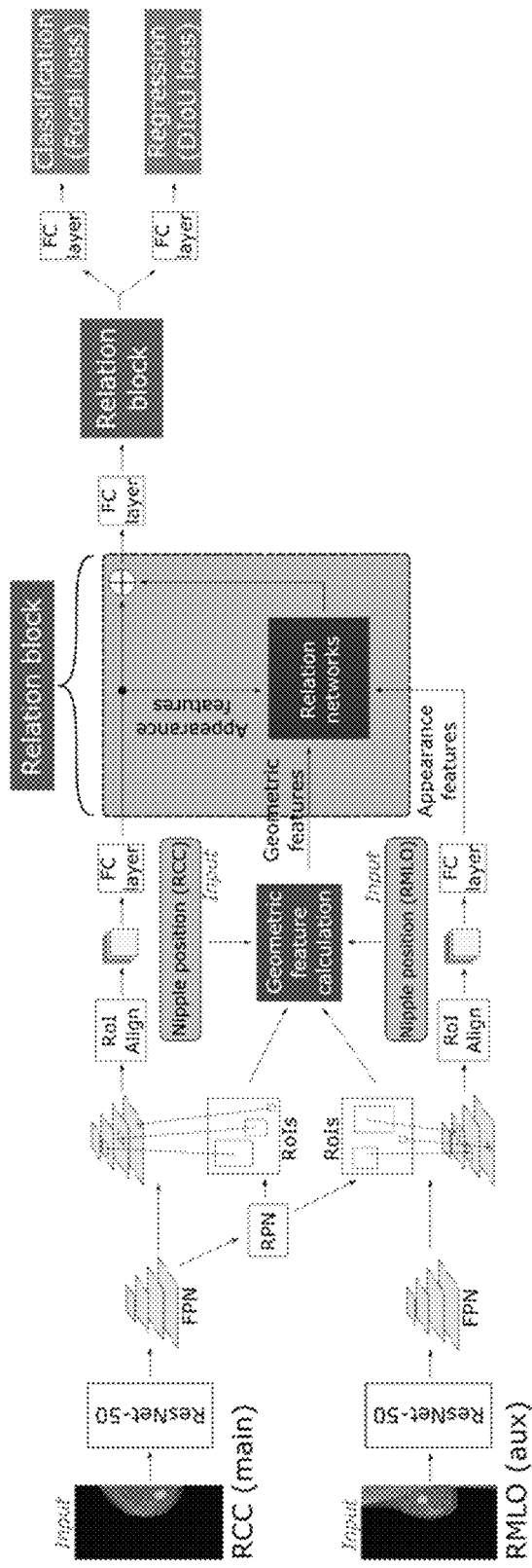
FIG. 4 illustrates a schematic architecture of an exemplary ipsilateral analyzer in the apparatus for mammographic multi-view mass identification shown in FIG. 1.
Figure 5:
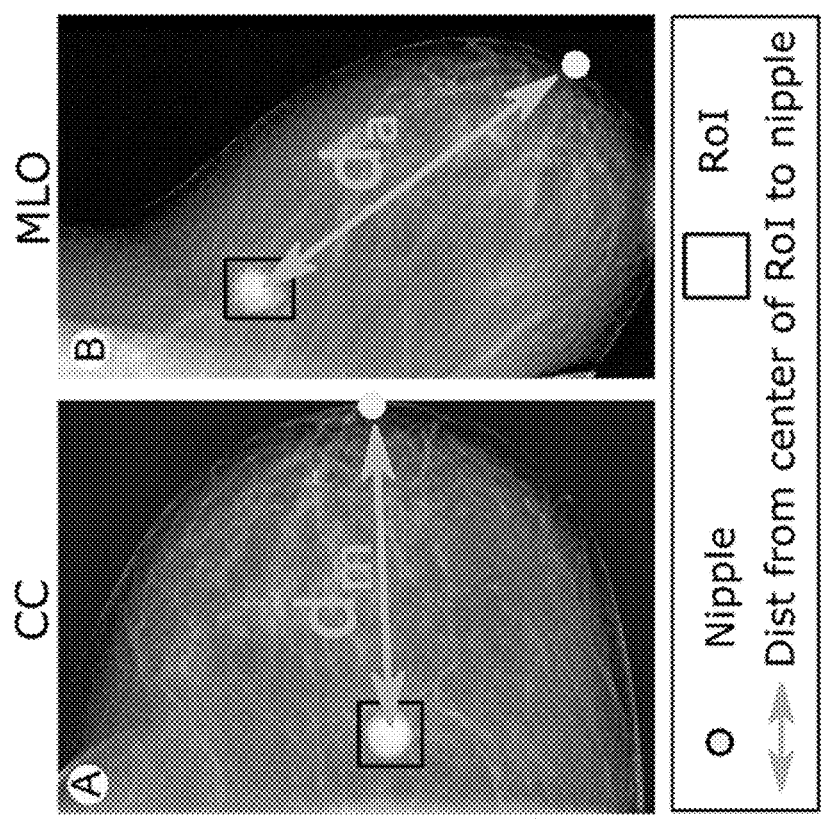
FIG. 5 illustrates an example of similarity of RoI-to-nipple distances in a craniocaudal image and a mediolateral oblique image.

Ipsilateral images provide information of the same breast from two different views. Therefore, a mass in the ipsilateral images usually presents similar brightness, shapes, sizes, and distances to the nipple. This knowledge is essential to help radiologists make a decision. To incorporate this diagnostic knowledge, an ipsilateral analyzer is developed. FIG. 4 illustrates a schematic architecture of an exemplary ipsilateral analyzer in the apparatus for mammographic multi-view mass identification shown in FIG. 1. Referring to FIG. 4, the ipsilateral analyzer may be built on a Faster-RCNN detection architecture. The ipsilateral analyzer may include a second Siamese input pattern, a feature pyramid networks (FPN) module, and a relation block. The second Siamese input pattern together with the FPN module may enable the two input branches to share the same weights and extract the features from the two ipsilateral views in the same way. As a result, the appearance similarity and the geometry constraint between RoIs from the two branches may be computed using the relation block. Further, the mass information of pixels in the main image may be detected and converted into a probability map. In addition, during a training process, focal loss (FL) and Distance-intersection-over-union loss (DIoU) may be used to improve the performance of the ipsilateral analyzer, and training with negative samples (normal cases) may be enabled. It should be noted that the ipsilateral analyzer may include more than one relation block to improve the output. For example, as shown in FIG. 4, a second relation block (without showing the details in the relation block) may be used to compute the appearance similarity and the geometry constraint between RoIs again, and thus improve the accuracy of the results.

In FIG. 4, the relation block may model the attention-based relationships between two RoIs in single image based on the similarity of their appearance and geometric features, leading to an improvement of detection accuracy. For example, the relation block may model the relationships between two RoIs in a single image based on similarities in the brightness, the shapes, the sizes, and the locations of the RoIs. In one embodiment, the relative position of a RoI may include a distance from the RoI to the nipple location determined by the nipple detector. In addition, the relation block may be proposed to emphasize the appearance and geometric similarities of a lesion RoI in two ipsilateral images. In one embodiment, the appearance and geometric similarities may be described by $$\mathcal{E}(g_m^i, g_a^j) = \mathcal{E}\left(\left[\log\left(\frac{d_m^i}{d_a^j}\right), \log\left(\frac{w_m^i}{w_a^j}\right), \log\left(\frac{h_m^i}{h_a^j}\right)\right]^T\right), \quad (1)$$

where $\mathcal{E}(\cdot,\cdot)$ is a geometric embedding operation, $g_m^i$ is the geometric factor of the i-th RoI from the main image, $g_a^j$ is the geometric factor of the j-th RoI from the auxiliary image, $d_m^i$ is the RoI-to-nipple distance of the i-th RoI from the main image, $d_a^j$ is the RoI-to-nipple distance of the j-th RoI from the auxiliary image, $w_m^i$ is the width of the i-th RoI from the main image, $w_a^j$ is the width of the j-th RoI from the auxiliary image, $h_m^i$ is the height of the i-th RoI from the main image, and $h_a^j$ is the height of the j-th RoI from the auxiliary image.

Figure 6:
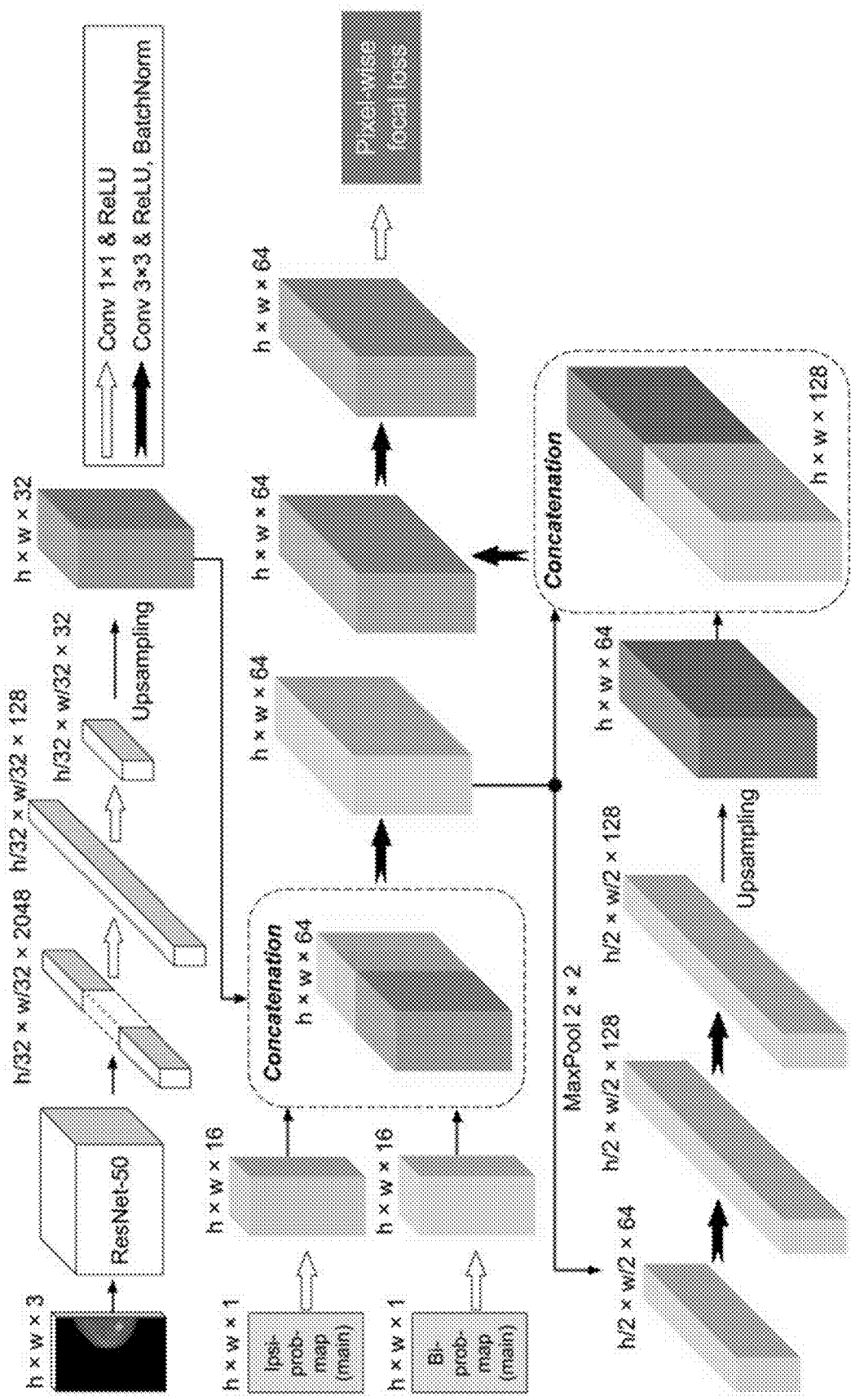
FIG. 6 illustrates a schematic architecture of an exemplary integrated fusion network device in the apparatus for mammographic multi-view mass identification shown in FIG. 1.

To integrate the outputs of both ipsilateral and bilateral learning, an integrated fusion network is designed to accept three inputs: the main image and the two probability maps from the ipsilateral analyzer and the bilateral analyzer (referring to FIGS. 1-2). These two probability maps may be attentions of the comprehensive information from both bilateral and ipsilateral images. The strategy is also applied for mammogram cancer screening. FIG. 6 illustrates a schematic architecture of an exemplary integrated fusion network device in the apparatus for mammographic multi-view mass identification shown in FIG. 1. It should be noted that the ResNet-50 backbone in FIG. 6 comes from the ipsilateral analyzer and is frozen during the training process. The integrated fusion network may be configured to process the inputs and generate a prediction result.

Figure 7:
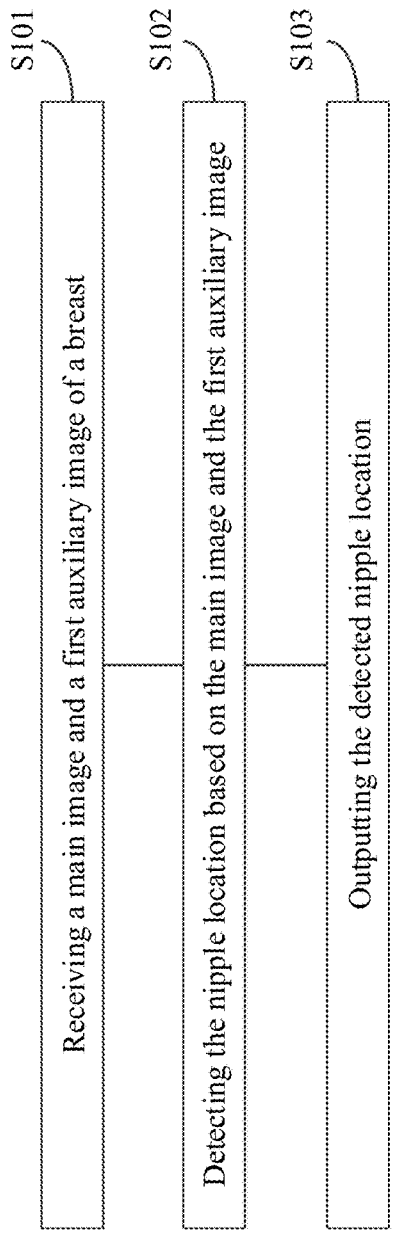
FIG. 7 illustrates a schematic flowchart of an operation process of a nipple detector according to various embodiments of the present disclosure.

The present disclosure also provides a method for mammographic multi-view mass identification. The method may be applied to an apparatus consistent with various embodiments of the present disclosure. That is, the apparatus may include a nipple detector, an image register, an ipsilateral analyzer, a bilateral analyzer, and an integrated fusion network device. FIG. 7 illustrates a schematic flowchart of an operation process of a nipple detector according to various embodiments of the present disclosure.

Referring to FIG. 7, the method may include: in S101, receiving, by the nipple detector, a main image and a first auxiliary image of a breast of a person; in S102, detecting, by the nipple detector, the nipple location based on the main image and the first auxiliary image; and in S103, outputting, by the nipple detector, the detected nipple location. In one embodiment, the main image may be an RCC image, and the first auxiliary image may be an ipsilateral image, e.g., an RMLO image.

Figure 8:
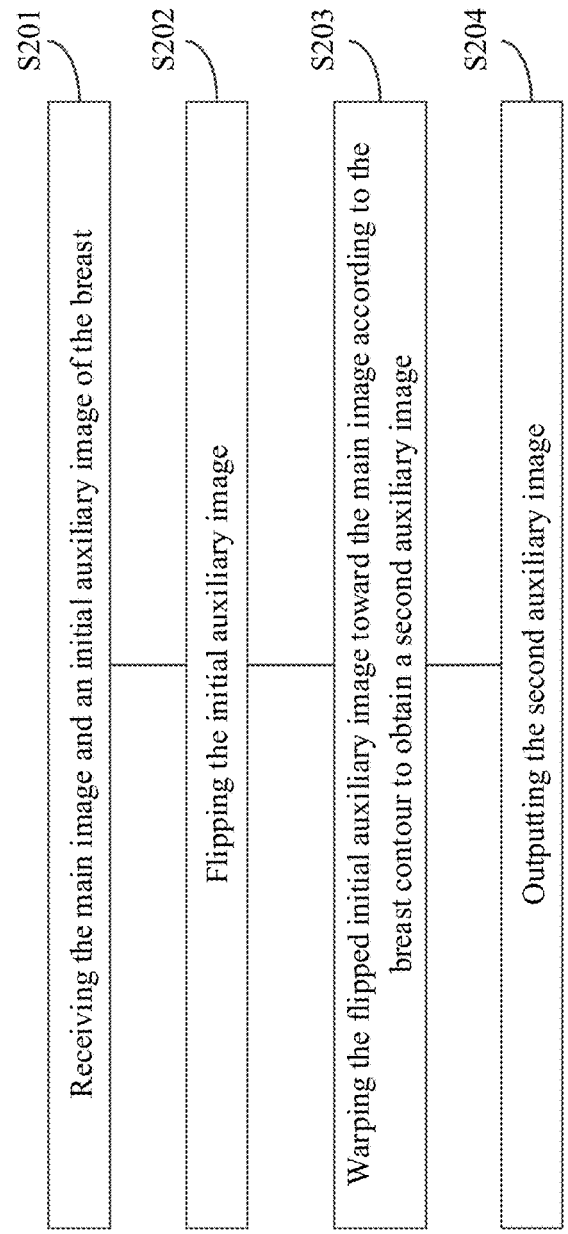
FIG. 8 illustrates a schematic flowchart of an operation process of an image register according to various embodiments of the present disclosure.

FIG. 8 illustrates a schematic flowchart of an operation process of an image register according to various embodiments of the present disclosure. Referring to FIG. 8, the method may also include: in S201, receiving, by the image register, the main image and an initial auxiliary image; in S202, flipping the initial auxiliary image; in S203, warping the flipped initial auxiliary image toward the main image according to the breast contour to obtain a second auxiliary image; and in S204, outputting, by the image register, the second auxiliary image. In one embodiment, the initial auxiliary image received by the image register may be a bilateral image, e.g., an LCC image.

Figure 9:
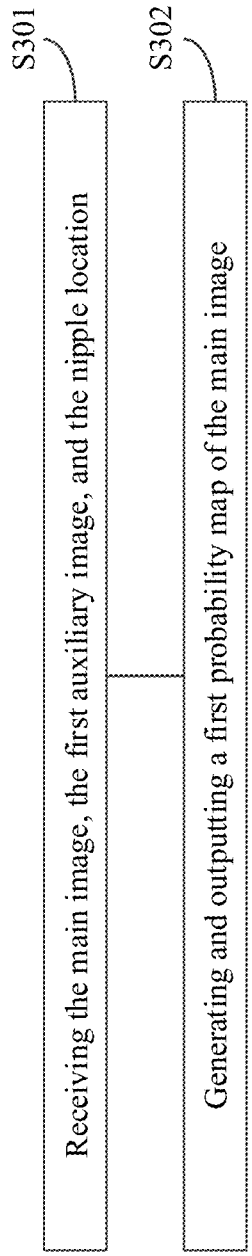
FIG. 9 illustrates a schematic flowchart of an operation process of an ipsilateral analyzer according to various embodiments of the present disclosure.

FIG. 9 illustrates a schematic flowchart of an operation process of an ipsilateral analyzer according to various embodiments of the present disclosure. Referring to FIG. 9, the method may include: in S301, receiving, by the ipsilateral analyzer, the main image, the first auxiliary image, and the nipple location; and in S302, generating and outputting, by the ipsilateral analyzer, a first probability map (e.g., Ipsi-prob map) of the main image based on the main image, the first auxiliary image, and the nipple location.

Figure 10:
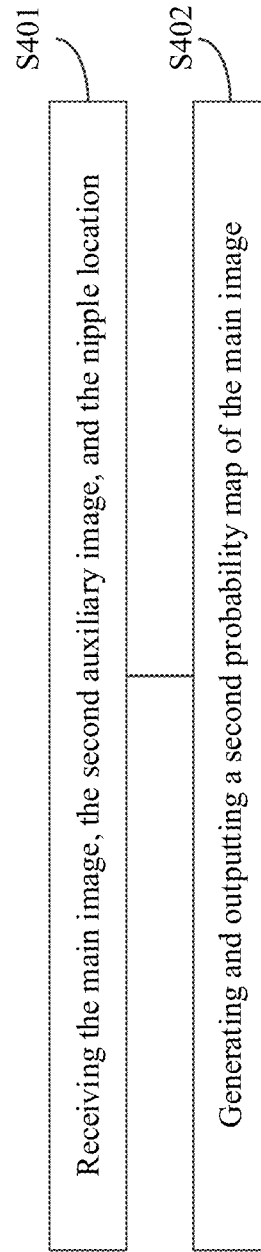
FIG. 10 illustrates a schematic flowchart of an operation process of a bilateral analyzer according to various embodiments of the present disclosure.

FIG. 10 illustrates a schematic flowchart of an operation process of a bilateral analyzer according to various embodiments of the present disclosure. Referring to FIG. 10, the method may include: in S401, receiving, by the bilateral analyzer, the main image, the second auxiliary image, and the nipple location; and in S402, generating and outputting, by the bilateral analyzer, a second probability map (e.g., Bi-prob map) of the main image based on the main image, the second image, and the nipple location.

Figure 11:
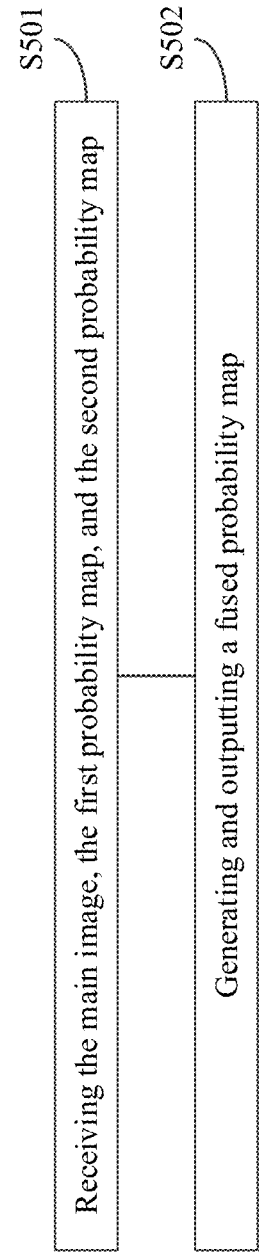
FIG. 11 illustrates a schematic flowchart of an operation process of an integrated fusion network device according to various embodiments of the present disclosure.

FIG. 11 illustrates a schematic flowchart of an operation process of an integrated fusion network device according to various embodiments of the present disclosure. Referring to FIG. 11, the method may further include: in S501, receiving, by the integrated fusion network device, the main image, the first probability map, and the second probability map; and in S502, generating and outputting a fused probability map based on the main mage, the first probability map, and the second probability map.

The combined analysis may be applied to all views in available datasets to generate mass detection on each view. In practice, the available datasets include a public dataset and an in-house dataset. The public dataset is Digital Database for Screening Mammography (DDSM) dataset that has been widely used for mammographic lesion detection. The DDSM dataset contains 2,620 patient cases, each of which has four views of mammograms (two views of each breast: left CC & MLO, right CC & MLO). Excluding some defective/corrupted cases, 2,578 cases (10,312 images in total) are applied to the disclosed apparatus. All cases are randomly divided into the training, validation, and test sets by approximately 8:1:1, resulting in 8,256, 1,020 and 1,036 images in the respective sets. The in-house dataset is obtained from a hospital to validate the proposed method. The in-house mammogram dataset has 2,749 cases, including normal, cancer, and benign cases, which are close to the practical distribution. Lesion regions are first annotated by two radiologists and then reviewed by a senior radiologist. Same as the division strategy on the public DDSM dataset, all cases are randomly split by 8:1:1 and the training, validation and test sets have 8,988, 1,120, and 1,120 images, respectively. It should be noted that some cases have mammograms taken at multiple dates.

To facilitate the DNN-based learning of the symmetry constraint from the bilateral images, the input pair of the same view images (e.g. two CC view images or two MLO view images) may be registered. In one embodiment, as shown in FIG. 2, the input pair of images may be two CC view images, e.g., the RCC image and the LCC image. It should be noted that in other embodiments, the input pair of images may be two MLO view images, e.g., RMLO and LMLO. Further, the auxiliary image input into the image register may be horizontally flipped, and then warped toward the main image according to the breast contour. In addition, nipple locations may be used to roughly align the two MLO images before warping. A flipped and warped CC view example is shown in FIG. 2.

The model on each dataset is independently trained based on a pre-trained ImageNet model. State-of-the-art (SOTA) free-response operating characteristic (FROC) may be selected as the evaluation metric to make comparison with known methods. A mass may be assumed as successfully identified when the Intersection-over-Union (IoU) of a prediction output and the ground truth is greater than 0.2.

The bilateral analyzer, the ipsilateral analyzer, and a degraded version of the ipsilateral analyzer, e.g., "IpsiDualNet w/o Relation Blocks" (the two feature streams from the main and auxiliary images are directly concatenated after the RoI align stage), are trained and tested using both ipsilateral and bilateral images. Table 1 shows the results (e.g., ablation study results) on DDSM, which indicate that the bilateral analyzer always achieves the highest recall scores on bilateral images, and the ipsilateral analyzer has generally better performance on ipsilateral images. In addition, the ipsilateral analyzer outperforms the degraded version on ipsilateral images, suggesting that the designed relation module remarkably enhances the performance of the ipsilateral analyzer. Thus, the bilateral analyzer and the ipsilateral analyzer may be respectively applied to bilateral and ipsilateral analysis in the apparatus for mammographic multi-view mass identification. Therefore, segmentation network may be able to maintain spatial information, and thus may be more appropriate for symmetry learning, while detection network may be more suitable for RoI-based relation learning.

TABLE 1

| Networks | Ipsilateral (Recall@FPI) | | | Bilateral (Recall@FPI) | | |
| --- | --- | --- | --- | --- | --- | --- |
| | R@0.5 | R@1.0 | R@2.0 | R@0.5 | R@1.0 | R@2.0 |
| BiDualNet | 0.67 | 0.81 | 0.89 | 0.78 | 0.84 | 0.89 |
| IpsiDualNet w/o Relation Blocks | 0.68 | 0.77 | 0.84 | 0.73 | 0.79 | 0.84 |
| IpsiDualNet | 0.76 | 0.83 | 0.88 | 0.65 | 0.75 | 0.82 |

In addition, the impact of different geometric features on the ipsilateral analyzer, including the shape and location of RoI, the dummy nipple, and the RoI-to-nipple-distance is also investigated. Table 2 shows impact of different geometric features on prediction performance of the in-house dataset. As shown in Table 2, the result demonstrates that the RoI-to-nipple-distance based geometric features may be able to generate the best performance of the ipsilateral analyzer.

TABLE 2

| Geometric Features | R @ 0.5 | R @ 1.0 | R @ 2.0 |
| --- | --- | --- | --- |
| Shape and location of RoI | 0.86 | 0.90 | 0.93 |
| Dummy nipple point (Central point of every image) | 0.80 | 0.85 | 0.89 |
| RoI-to-nipple distance (this disclosure, in IpsiDualNet) | 0.88 | 0.92 | 0.96 |

Table 3 compares the performance of various methods on the DDSM dataset. Different single-view and dual-view approaches that reported evaluation on DDSM with normal patients' data using the FROC metric are selected as competing methods. The disclosed tri-view method demonstrates a higher recall score than any existing single-view or dual-view method. In Table 3, CVR-RCNN denotes Cross-View Relation Region-based Convolutional Neural Network and CBN denotes Contrasted Bilateral Network.

TABLE 3

| | | DDSM | Recall @ FPI | | |
| --- | --- | --- | --- | --- | --- |
| View | Method | (train/val/test) | R @ 0.5 | R @ 1.0 | R @ 2.0 |
| Single | Reference 1: Faster-RCNN | 80%/10%/10% | 0.6610 | 0.7246 | 0.7839 |
| | Reference 1: Mask-RCNN | | 0.6441 | 0.7458 | 0.8178 |
| | DeepLab + NL + PWFL | 8256/1020/1036 | 0.68 | 0.78 | 0.83 |
| | Faster-RCNN + FPN + FL + DIoU | | 0.74 | 0.82 | 0.88 |

TABLE 3-continued

| View | Method | DDSM (train/val/test) | Recall @ FPI | | |
|---|---|---|---|---|---|
| | | | R @ 0.5 | R @ 1.0 | R @ 2.0 |
| Dual | Reference 2: CVR-RCNN | 410/—/102 | n/a | n/a | ~0.88 |
| | Reference 1: CBN | 80%/10%/10% | 0.6907 | 0.7881 | 0.8559 |
| | BiDualNet | 8256/1020/1036 | 0.78 | 0.84 | 0.89 |
| | IpsiDualNet | | 0.76 | 0.83 | 0.88 |
| Tri | This disclosure | 8256/1020/1036 | 0.80 | 0.85 | 0.89 |

Various methods are also tested on the in-house dataset as shown in Table 4. The disclosed tri-view method again achieves the highest recall score at all FPIs. In addition, due to the higher quality of the images, the proposed method achieves a remarkably higher recall score on the in-house dataset than on the DDSM dataset. Moreover, it should be noted that the disclosed apparatus is capable of accepting mammograms with incomplete views.

TABLE 4

| View Type | Method | R @ 0.5 | R @ 1.0 | R @ 2.0 |
|---|---|---|---|---|
| Single-View | DeepLab + NL + PWFL | 0.81 | 0.84 | 0.90 |
| | Faster-RCNN + FPN + FL + DIoU | 0.82 | 0.89 | 0.91 |
| Dual-View | BiDualNet | 0.87 | 0.93 | 0.95 |
| | IpsiDualNet | 0.88 | 0.92 | 0.96 |
| Tri-View | This disclosure | 0.90 | 0.94 | 0.96 |

Compared to exiting systems and methods for mammographic lesion detection, the disclosed apparatus and method demonstrate the following exemplary advantages.

According to the disclosed apparatus and method, a first tri-view DNN architecture is adopted to fully aggregate information from all views and thus perform joint end-to-end ipsilateral and bilateral analysis. Further, a novel relation network designed in tandem with a DNN-based nipple detector is developed to incorporate geometry constraint across views, which improves the accuracy of the analysis. Moreover, by adopting the disclosed apparatus and method, SOTA FROC performance is achieved on both the DDSM dataset and the in-house dataset.

The embodiments provided in the present disclosure are described in a progressive manner. Each embodiment focuses on the differences from other embodiments, and the same or similar parts among these embodiments may be referred to each other. For the devices disclosed in the embodiments, the description may be relatively simple because of the corresponding relation between the devices and the disclosed methods. The details of the disclosed devices may be referred to the corresponding content in the description of the methods.

Those skilled in the art may further realize that the units and algorithm steps of the examples described with reference to the embodiments disclosed herein can be implemented by electronic hardware, computer software, or a combination of the two. To clearly illustrate the interchangeability of hardware and software, the components and steps of various examples have been generally described in terms of their functionality. Whether these functions are implemented by hardware or software depends on the specific application and the design constraints of the technical solutions. A person skilled in the art may use different methods to implement the described functions for each particular application. However, such implementation should not be considered as beyond the scope of the present disclosure.

The steps of the method or algorithm described in the embodiments disclosed herein may be implemented directly by hardware, a processor-executable software module, or a combination of the two. The software module may be located in random access memories (RAMs), internal memories, read-only memories (ROMs), electrically programmable ROMs, electrically erasable programmable ROM, registers, hard disks, removable disks, CD-ROMs, or other storage media that are well known in the field.

The description of the disclosed embodiments provided above ensures that those skilled in the art can realize or use the present disclosure. Various modifications to the embodiments are readily apparent to those skilled in the art. The general principles herein may be implemented in other embodiments without departing from the spirit or scope of the disclosure. Therefore, the present disclosure should not be limited to these embodiments described herein, but rather should be in accordance with the broadest scope consistent with the principles and the novel features disclosed herein.

What is claimed is:

1. A method, applied to an apparatus for mammographic multi-view mass identification, comprising:
    receiving a main image, a first auxiliary image, and a second auxiliary image, wherein the main image and the first auxiliary image are images of a breast of a person, and the second auxiliary image is an image of another breast of the person;
    detecting a nipple location based on the main image and the first auxiliary image;
    generating a first probability map of the main image based on the main image, the first auxiliary image, and the nipple location by an ipsilateral analyzer that is built on a Faster-RCNN detection architecture and configured for:
        enabling two input branches to share same weights and extract features from the main image and the first auxiliary image in a same way, and
        modelling relationships between two region of interests (RoIs) in a single image based on similarities in brightness, shapes, area sizes, and relative positions of the RoIs,
        wherein a relative position of a RoI includes a distance from the RoI to the nipple location, and in a training process, focal loss and distance-intersection-over-union loss (DIoU) is used to improve performance of the ipsilateral analyzer;
    generating a second probability map of the main image based on the main image, the second auxiliary image, and the nipple location; and
    generating and outputting a fused probability map based on the first probability map and the second probability map.

2. The method according to claim 1, wherein the apparatus for mammographic multi-view mass identification further includes a nipple detector, a bilateral analyzer, and an integrated fusion network device, and the method includes:
receiving, by the nipple detector, the main image and the first auxiliary image;
detecting, by the nipple detector, the nipple location based on the main image and the first auxiliary image;
receiving, by the ipsilateral analyzer, the main image, the first auxiliary image, and the nipple location obtained by the nipple detector;
generating and outputting, by the ipsilateral analyzer, the first probability map of the main image;
receiving, by the bilateral analyzer, the main image, the second auxiliary image, and the nipple location;
generating and outputting, by the bilateral analyzer, the second probability map of the main image;
receiving, by the integrated fusion network device, the main image, the first probability map, and the second probability map; and
generating and outputting, by the integrated fusion network device, the fused probability map.

3. The method according to claim 2, wherein the apparatus further includes an image register, and the method further includes:
receiving, by the image register, the main image and an initial auxiliary image;
flipping, by the image register, the initial auxiliary image; and
warping, by the image register, the flipped initial auxiliary image toward the main image according to a breast contour to obtain the second auxiliary image.

4. The method according to claim 3, wherein:
the main image is selected from an LCC image, an RCC image, an LMLO image, and an RMLO image; and
when the main image is the LCC image, the first auxiliary image is the LMLO image, and the initial auxiliary image is the RCC image; when the main image is the RCC image, the first auxiliary image is the RMLO image, and the initial auxiliary image is the LCC image; when the main image is the LMLO image, the first auxiliary image is the LCC image, and the initial auxiliary image is the RMLO image; and when the main image is the RMLO image, the first auxiliary image is the RCC image, and the initial auxiliary image is the LMLO image.

5. The method according to claim 2, wherein:
the first probability map includes mass information of pixels in the main image generated by the ipsilateral analyzer;
the second probability map includes mass information of pixels in the main image generated by the bilateral analyzer; and
the mass information of a pixel in the main image includes a texture density determined by brightness of the pixel.

6. The method according to claim 5, further including:
computing, by each of the ipsilateral analyzer and the bilateral analyzer and based on input images, similarities of adjacent pixels to determine a region containing pixels with similar brightness;
determining, by each of the ipsilateral analyzer and the bilateral analyzer, a shape, an area size, and a relative position with respect to the nipple location for the determined region; and
determining, by each of the ipsilateral analyzer and the bilateral analyzer, a region with at least one of the brightness, the shape, the area size, and the relative position deviating from a preset value as the region of interest (RoI).

7. The method according to claim 2, wherein each of the first probability map and the second probability map further includes a lesion possibility of each pixel on the main image, and the method further includes:
computing, by each of the ipsilateral analyzer and the bilateral analyzer and based on input images, the lesion possibility of each pixel on the main image; and
determining, by each of the ipsilateral analyzer and the bilateral analyzer, a region of pixels having lesion possibilities exceeding a preset possibility as the region of interest (RoI).

8. The method according to claim 2, wherein the fused probability map includes a lesion possibility of each pixel on the main image, and the method further includes:
computing, by the integrated fusion network device, the lesion possibility of each pixel on the main image based on the first probability map, the second probability map, and the main image.

9. An apparatus for mammographic multi-view mass identification, comprising:
a nipple detector, configured to receive a main image and a first auxiliary image of a breast of a person, and detect a nipple location based on the main image and the first auxiliary image;
an ipsilateral analyzer, configured to receive the main image, the first auxiliary image, and the nipple location obtained by the nipple detector, and generate and output a first probability map of the main image;
a bilateral analyzer, configured to receive the main image together with the nipple location, and a second auxiliary image, and generate and output a second probability map of the main image, wherein the second auxiliary image is an image of another breast of the person; and
an integrated fusion network device, configured to receive the main image, the first probability map, and the second probability map, and generate and output a fused probability map, wherein the ipsilateral analyzer is built on a Faster-RCNN detection architecture and includes a second Siamese input pattern, a feature pyramid networks (FPN) module, and at least one relation block, wherein:
the second Siamese input pattern and the FPN module are together configured to enable two input branches to share same weights and extract features from the main image and the first auxiliary image in a same way, and
the at least one relation block models relationships between two region of interests (RoIs) in a single image based on similarities in brightness, shapes, area sizes, and relative positions of the RoIs,
wherein a relative position of a RoI includes a distance from the RoI to the nipple location; and in a training process, focal loss and distance-intersection-over-union loss (DIoU) is used to improve performance of the ipsilateral analyzer.

10. The apparatus according to claim 9, wherein:
the main image is selected from a left craniocaudal (LCC) image, a right craniocaudal (RCC) image, a left mediolateral oblique (LMLO) image, and a right mediolateral oblique (RMLO) image; and
when the main image is an LCC image, the first auxiliary image is an LMLO image; when the main image is the RCC image, the first auxiliary image is the RMLO image; when the main image is the LMLO image, the first auxiliary image is the LCC image; and when the main image is the RMLO image, the first auxiliary image is the RCC image.

11. The apparatus according to claim 9, further including:
an image register, configured to receive the main image and an initial auxiliary image, flip the initial auxiliary image, and warp the flipped initial auxiliary image toward the main image according to a breast contour to obtain the second auxiliary image.

12. The apparatus according to claim 11, wherein:
the main image is selected from an LCC image, an RCC image, an LMLO image, and an RMLO image; and
when the main image is the LCC image, the first auxiliary image is the LMLO image, and the initial auxiliary image is the RCC image; when the main image is the RCC image, the first auxiliary image is the RMLO image, and the initial auxiliary image is the LCC image; when the main image is the LMLO image, the first auxiliary image is the LCC image, and the initial auxiliary image is the RMLO image; and when the main image is the RMLO image, the first auxiliary image is the RCC image, and the initial auxiliary image is the LMLO image.

13. The apparatus according to claim 9, wherein:
the nipple detector is a deep neural network (DNN) based nipple detector.

14. The apparatus according to claim 9, wherein:
the first probability map includes mass information of pixels in the main image generated by the ipsilateral analyzer; and
the second probability map includes mass information of pixels in the main image generated by the bilateral analyzer.

15. The apparatus according to claim 14, wherein:
the mass information of a pixel in the main image includes a texture density determined by brightness of the pixel.

16. The apparatus according to claim 15, wherein:
each of the ipsilateral analyzer and the bilateral analyzer is configured to, based on input images, compute similarities of adjacent pixels to determine a region containing pixels with similar brightness;
each of the ipsilateral analyzer and the bilateral analyzer is further configured to determine a shape, an area size, and a relative position with respect to the nipple location for the determined region; and
each of the ipsilateral analyzer and the bilateral analyzer is further configured to determine a region with at least one of the brightness, the shape, the area size, and the relative position deviating from a preset value as the region of interest (RoI).

17. The apparatus according to claim 15, wherein:
each of the first probability map and the second probability map further includes a lesion possibility of each pixel on the main image;
each of the ipsilateral analyzer and the bilateral analyzer is further configured to compute, based on input images, the lesion possibility of each pixel on the main image; and
each of the ipsilateral analyzer and the bilateral analyzer is further configured to determine a region of pixels having lesion possibilities exceeding a preset possibility as the region of interest (RoI).

18. The apparatus according to claim 9, wherein:
the fused probability map includes a lesion possibility of each pixel on the main image, and the integrated fusion network device is configured to compute the lesion possibility of each pixel on the main image based on the first probability map, the second probability map, and the main image.

19. An apparatus for mammographic multi-view mass identification, comprising:
a nipple detector, configured to receive a main image and a first auxiliary image of a breast of a person, and detect a nipple location based on the main image and the first auxiliary image;
an ipsilateral analyzer, configured to receive the main image, the first auxiliary image, and the nipple location obtained by the nipple detector, and generate and output a first probability map of the main image;
a bilateral analyzer, configured to receive the main image together with the nipple location, and a second auxiliary image, and generate and output a second probability map of the main image, wherein the second auxiliary image is an image of another breast of the person; and
an integrated fusion network device, configured to receive the main image, the first probability map, and the second probability map, and generate and output a fused probability map, wherein:
the bilateral analyzer has a DeepLab v3+ structure, and includes a first Siamese input pattern, and a pixel-wise focal loss (PWFL) function, wherein:
the first Siamese input pattern includes two atrous convolution modules, configured to receive the main image and the second auxiliary image, respectively;
the two atrous convolution modules share same weights and extract feature maps from the main image and the second auxiliary image in a same manner;
each atrous convolution module includes a 50-layer residual network (ResNet-50) and a non-local (NL) block, wherein the ResNet-50 functions as a backbone, and the NL block is located between a fourth stage and a fifth stage of the ResNet-50;
the atrous convolution module receiving the main image also includes an output for low-level features at a third stage;
outputs from the backbones of the two atrous convolution modules perform a channel-wise concatenation, and a 1×1 convolution down-samples a number of channels from a concatenated tensor into half;
the NL blocks of the two atrous convolution modules share weights, and dimensions of input and output of the NL blocks stay same;
an output of the bilateral analyzer is a segmentation map; and
during a training process, the PWFL function is used to improve performance of the bilateral analyzer.

20. The apparatus according to claim 19, wherein:
the main image is selected from a left craniocaudal (LCC) image, a right craniocaudal (RCC) image, a left mediolateral oblique (LMLO) image, and a right mediolateral oblique (RMLO) image; and
when the main image is an LCC image, the first auxiliary image is an LMLO image; when the main image is the RCC image, the first auxiliary image is the RMLO image; when the main image is the LMLO image, the first auxiliary image is the LCC image; and when the main image is the RMLO image, the first auxiliary image is the RCC image.

* * * * *